(12) United States Patent
Lu et al.

(10) Patent No.: US 9,813,764 B2
(45) Date of Patent: Nov. 7, 2017

(54) SET-TOP BOX DEVICE CAPABLE OF PROVIDING ELECTRICAL POWER TO AN ANTENNA

(71) Applicant: Tatung Technology Inc., Taipei (TW)

(72) Inventors: Ming-Yih Lu, Taipei (TW); Jui-Shuan Wu, Taipei (TW); Wen-Pu Chou, Taipei (TW); Han-Chung Chang, Taipei (TW)

(73) Assignee: TATUNG TECHNOLOGY INC., Taipei (TW)

( * ) Notice: Subject to any disclaimer, the term of this patent is extended or adjusted under 35 U.S.C. 154(b) by 257 days.

(21) Appl. No.: 14/682,279

(22) Filed: Apr. 9, 2015

(65) Prior Publication Data
US 2016/0073160 A1    Mar. 10, 2016

(30) Foreign Application Priority Data

Sep. 5, 2014   (TW) .............................. 103130759 A

(51) Int. Cl.
| | |
|---|---|
| *H04N 7/16* | (2011.01) |
| *H04N 21/443* | (2011.01) |
| *H04N 21/426* | (2011.01) |
| *H04N 5/63* | (2006.01) |
| *H04N 5/64* | (2006.01) |

(52) U.S. Cl.
CPC .......... *H04N 21/4436* (2013.01); *H04N 5/63* (2013.01); *H04N 21/426* (2013.01); *H04N 5/64* (2013.01)

(58) Field of Classification Search
CPC .......... H04N 21/443; H04N 5/63; H04N 5/64; H04N 21/426; H04N 21/4436

USPC .................................. 725/68, 71, 72, 151
See application file for complete search history.

(56) References Cited

U.S. PATENT DOCUMENTS

| | | | | |
|---|---|---|---|---|
| 6,034,865 | A * | 3/2000 | Roster ...................... | H02B 1/20 |
| | | | | 361/601 |
| 6,271,796 | B1 * | 8/2001 | Itoh ........................ | H01Q 1/243 |
| | | | | 343/702 |
| 2005/0168929 | A1 * | 8/2005 | Inoue ...................... | G06F 1/181 |
| | | | | 361/679.34 |

(Continued)

FOREIGN PATENT DOCUMENTS

| | | |
|---|---|---|
| CN | 2294547 Y | 10/1998 |
| CN | 201509264 U | 6/2010 |
| CN | 203340228 U | 12/2013 |

*Primary Examiner* — Nnenna Ekpo
(74) *Attorney, Agent, or Firm* — Bacon & Thomas, PLLC

(57) ABSTRACT

A set-top box device capable of providing electrical power to an antenna includes an insulation housing, a printed circuit board, a metal portion, and a conductive locking member. The insulation housing has at least one lateral arranged thereon a through hole portion. The printed circuit board is arranged in the insulation housing and includes a power supply module. The metal portion is arranged on the printed circuit board and includes a locking hole corresponding the through hole portion. The conductive locking member passes through the locking hole, the through hole portion, a conductive end portion of the power supply line, and the metal portion. The power supply module feeds a current into the antenna through a connection of the metal portion, the conductive locking member, and the conductive end portion, and the current flows to a ground portion of the signal line thereby forming a power supply loop.

10 Claims, 6 Drawing Sheets

(56) References Cited

U.S. PATENT DOCUMENTS

| | | | | |
|---|---|---|---|---|
| 2009/0268360 A1* | 10/2009 | Shinomiya | ............. | H02H 9/046 361/56 |
| 2011/0225609 A1* | 9/2011 | Li | ................ | H04N 5/44513 725/38 |
| 2013/0335989 A1* | 12/2013 | Sato | .................. | F21V 9/16 362/510 |

\* cited by examiner

SET-TOP BOX DEVICE CAPABLE OF PROVIDING ELECTRICAL POWER TO AN ANTENNA

BACKGROUND OF THE INVENTION

1. Field of the Invention

The present invention relates to a set-top box device capable of providing electrical power to an antenna and, more particularly, to a set-top box device suitable for providing electrical power of small current to an antenna.

2. Description of Related Art

Wireless television (TV) broadcasts all over the world have entered a digital generation and thus typical analog signals are increasingly diminished. In fact, whether the signals are analog or digital is insignificant in meaning to consumers since the contents of program essentially have no change. However, with the digital manner, it substantially announces that the wireless TV program has entered a high definition era. For the digital generation, a set-top box and correspondingly dedicated antenna for receiving signals are required. However, as the consumers haggle over every penny nowadays, one condition taken into account by the consumers is the price and power consumption of the set-top box and the corresponding dedicated antenna.

The dedicated antenna for receiving digital signals can be powered through an external adaptor or by directly connecting to a set-top box. However, if the external adaptor is used, the cost is relatively increased, and thus the price is also increased on products for sale. For the existing dedicated antenna that is powered by directly connecting to a set-top box, a power supply line directly connected to the set-top box for supplying power to the antenna is required in addition to a coaxial cable for signal transmission, so as to prevent the transmission interference. Currently, the power supply line connected to the antenna is inserted into a power input port, which is typically a USB port on a set-top box, resulting in that one of the USB ports on the set-top box is occupied, or the cost of one additional USB port is required.

Generally, the charging standard of USB port is an output voltage of 5V and an output current of 500 mA. However, the dedicated antenna is typically an active antenna, which usually needs a current of 10 mA only. That is, there is no need to have such a high current port for providing electrical power to a dedicated antenna.

Therefore, it is desirable to provide an improved set-top box device for providing electrical power to an antenna, which uses a small current to power the antenna, so as to effectively reduce the cost and mitigate and/or obviate the aforementioned problems.

SUMMARY OF THE INVENTION

It is an object of the present invention to provide a set-top box device capable of providing electrical power to an antenna, which applies a simple configuration to obtain the effect of providing a small current to power the antenna, so as to effectively reduce the device cost.

It is another object of the present invention to provide a set-top box device capable of providing electrical power to an antenna, which designs a short-circuit protection circuit on a printed circuit board to avoid the device from being a short-circuit damage caused by a connection or contact problem.

To achieve these objects, there is provided a set-top box device capable of providing electrical power to an antenna. The antenna is electrically coupled to the set-top box device through a signal line and a power supply line. The set-top box device comprises: an insulation housing having at least one lateral arranged thereon a through hole portion and at least one connection port hole; a printed circuit board arranged in the insulation housing and including a power supply module and at least one connection port corresponding to the at least one connection port hole for electrically coupling to the signal line; a metal portion arranged on the printed circuit board and including a locking hole corresponding to the through hole portion; and a conductive locking member passing through the locking hole, the through hole portion, a conductive end portion of the power supply line, and the metal portion, wherein the power supply module feeds a current into the antenna through a connection of the metal portion, the conductive locking member, and the conductive end portion, and the current flows to a ground portion of the signal line, thereby forming a power supply loop.

Thus, the set-top box device of the invention can directly supply power to the antenna through the metal portion, conductive locking member, and the conductive end portion, without requiring an additional connection port and resultant high power operation, so as to effectively reduce the cost and power consumption.

In the set-top box device of the invention, the power supply circuit includes a short-circuit protection circuit arranged between the power supply module and the metal portion, and the short-circuit protection circuit includes a diode and a resistor set with a rated power, wherein the current fed by the power supply module sequentially passes through the diode and the resistor set. Furthermore, when the metal portion, the conductive locking member, and the conductive end portion form a short-circuit path due to a contact problem, a power generated when the current passes through the resistor set is smaller than the rated power. That is, due to the design of the short-circuit protection circuit on the printed circuit board, it is able to avoid the short-circuit damage to the device caused by the contact problem. In addition, the resistor set may include a plurality of resistors connected in parallel for increasing an upper limit of the current provided by the power supply module.

Preferably, the power supply module provides an input voltage of 3.3V and an output current of 0.2 A, and the rated power of the resistor set is 0.3 W.

In the set-top box device of the invention, the conductive end portion of the power supply line includes a metal ring slice with a center hole and an outer portion.

Moreover, the through hole portion includes a recess portion and a through hole in the recess portion. The through hole corresponds to the center hole and the locking hole, and the recess portion has a sectional shape corresponding to that of the outer portion. Thus, the set-top box device of the invention can effectively receive the conductive end portion of the power supply line through a suitable shape of the through hole portion.

In the set-top box device of the invention, the conductive locking member is a screw.

In the set-top box device of the invention, the antenna is an active antenna. The active antenna includes an antenna unit and a control base coupled to the antenna unit. The control base is electrically coupled to the set-top box device through the signal line and the power supply line.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
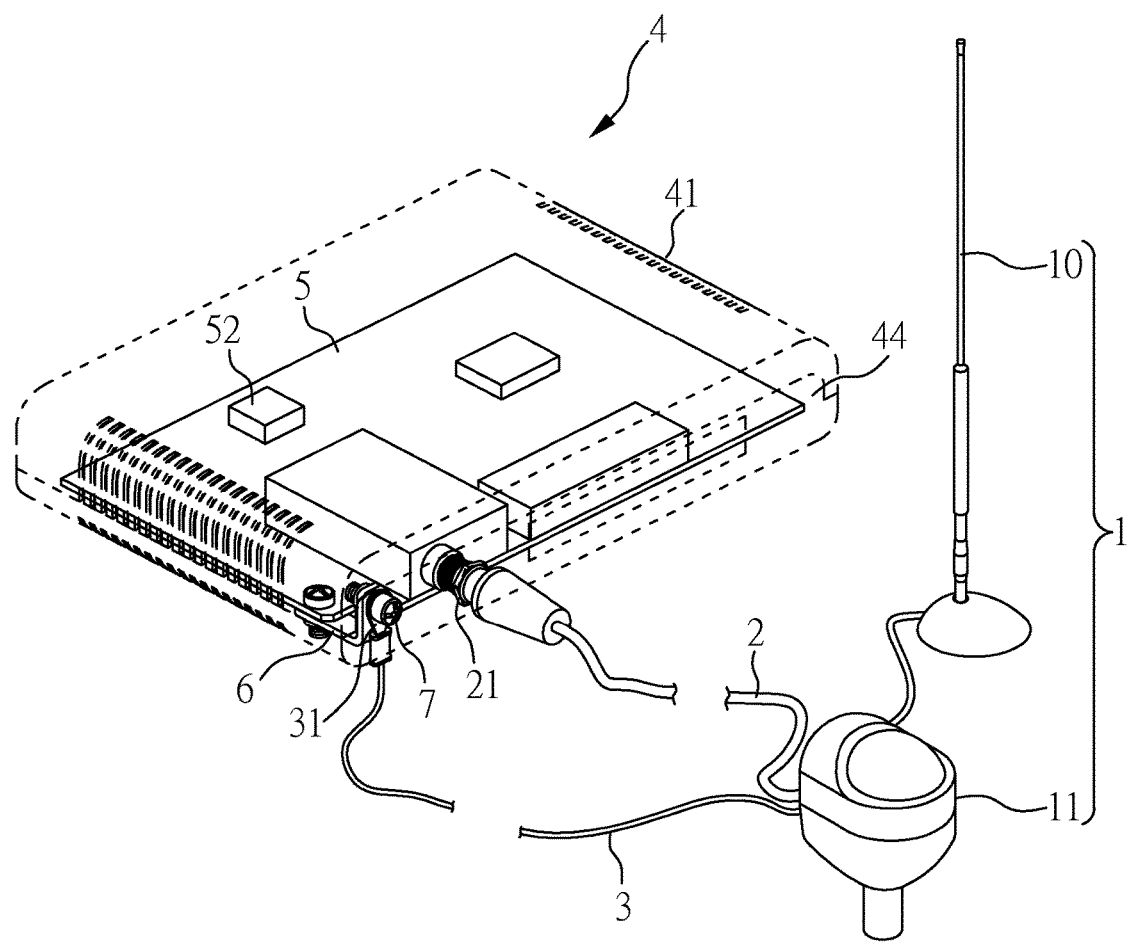
FIG. 1 is a schematic view of a set-top box device capable of providing electrical power to an antenna according to a preferred embodiment of the invention.
Figure 2:
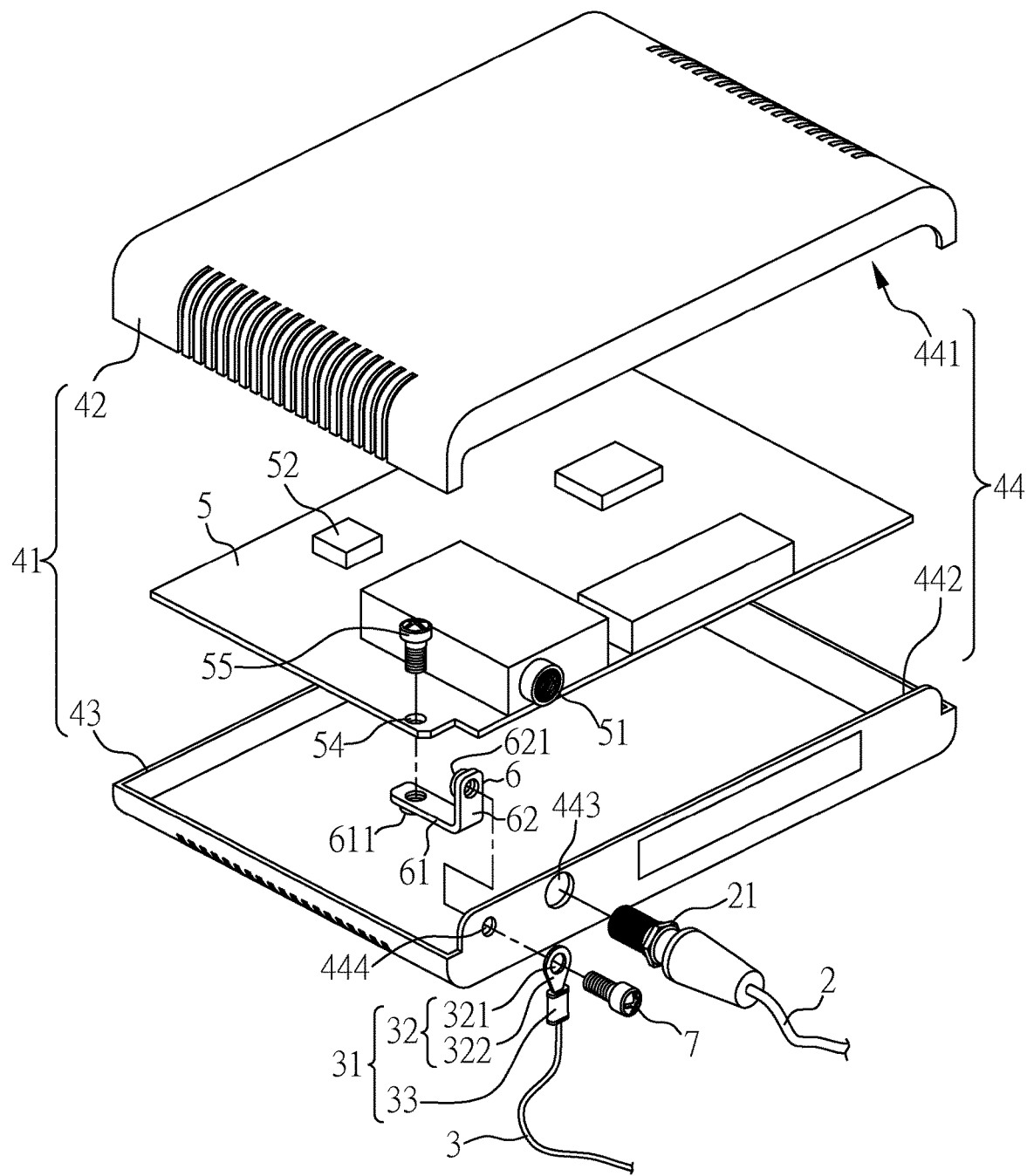
FIG. 2 is an exploded view of a set-top box device according to a preferred embodiment of the invention.

FIG. 1 is a schematic view of a set-top box device capable of providing electrical power to an antenna according to a preferred embodiment of the invention, and FIG. 2 is an exploded view of the set-top box device of FIG. 1. As shown in FIG. 1, the set-top box device 4 is capable of providing electrical power to an antenna 1. The antenna 1 is electrically coupled to the set-top box device 4 by a signal line 2 and a power supply line 3. The set-top box device 4 includes: an insulation housing 41, a printed circuit board 5, a metal portion 6, and a conductive locking member 7. In this embodiment, the antenna 1 is an active antenna having an antenna unit 10 and a control base 11. The control base 11 is electrically coupled to the antenna unit 10. The control base 11 is electrically coupled to the set-top box device 1 through the signal line 2 and the power supply line 3. The printed circuit board 5 is arranged in the insulation housing 41, and various circuits and components for performing different functions are arranged on the printed circuit board 5. In addition, the conductive locking member 7 is a metal screw.

As shown in FIG. 2, along with FIG. 1, the insulation housing 41 comprises an upper cover 42 and a base 43. The upper cover 42 joins into the base 43 to form the insulation housing 41. One lateral 44 of the insulation housing 41 has an upper recess portion 441 of the upper cover 42 and a lower convex portion 442 of the base 43. The upper recess portion 441 correspondingly joins into the lower convex portion 442 to form the lateral 44 of the insulation housing 41. A through hole portion 444 and a connection port hole 443 are arranged on the lower convex portion 442. In this embodiment, the through hole portion 444 is a through hole. The printed circuit board 5 is arranged on the base 43 and includes a connection port 51, a penetrating hole 54, and a power supply module 52. The connection port 51 is corresponding to the connection port hole 443 for electrically coupling to the signal line 2. Thus, a signal end portion 21 of the signal line 2 is inserted into the connection port 51 through the connection port hole 443 for signal transmission. The power supply module 52 is arranged on a surface of the printed circuit board 5. The penetrating hole 54 passes through the printed circuit board 5. In this embodiment, a conductive end portion 31 of the power supply line 3 has a metal ring slice 32 and a sleeve 33. The metal ring slice 32 is an extension of the sleeve 33, and includes a center hole 321 and an outer portion 322, wherein the outer portion 322 surrounds the center hole 321.

Furthermore, the metal portion 6 has a first metal section 61 and a second metal section 62. The first metal section 61 orthogonally joints the second metal section 62 as a whole to form an L-shaped metal portion 6. The first metal section 61 of the metal portion 6 is arranged on and parallel with the printed circuit board 5. The first metal section 61 has a first locking hole 611 on its free end. The metal portion 6 is locked on the printed circuit board 5 by a locking member 55 passing through the first locking hole 611 and the penetrating hole 54. In addition, the second metal section 62 is corresponding to and parallel with a lateral 44. The second metal section 62 has a second locking hole 621 on its free end. The second locking hole 621 is corresponding to the through hole portion 444, and the conductive locking member 7 passes through the second locking hole 621, the through hole portion 444, the center hole 321 of the conductive end portion 31 of the power supply line 3, and the second locking hole 621 of the metal portion 6.

Figure 3:
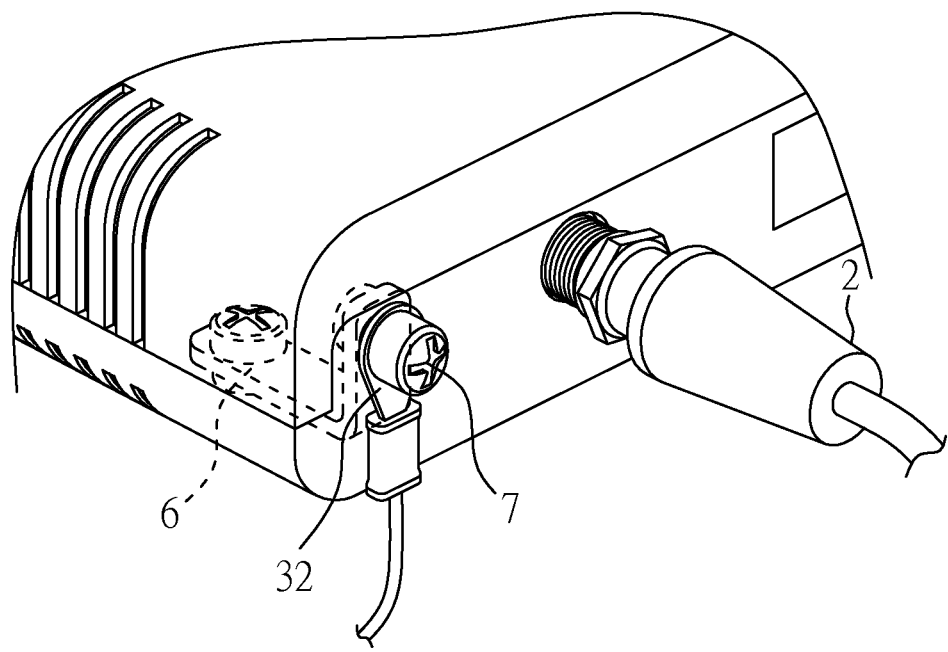
FIG. 3 is an enlarged view of a part of FIG. 1.

With reference to FIG. 3, which is an enlarged view of a part of FIG. 1, along with FIGS. 1 and 2, the power supply module 52 of the set-top box device 4 of FIG. 2 feeds current into the antenna 1 through a connection of the metal portion 6, the conductive locking member 7, and the metal ring slice 32 of the conductive end portion 31, wherein the current flows to a ground portion (not shown) of the signal line 2, thereby forming a power supply loop.

Figure 4:
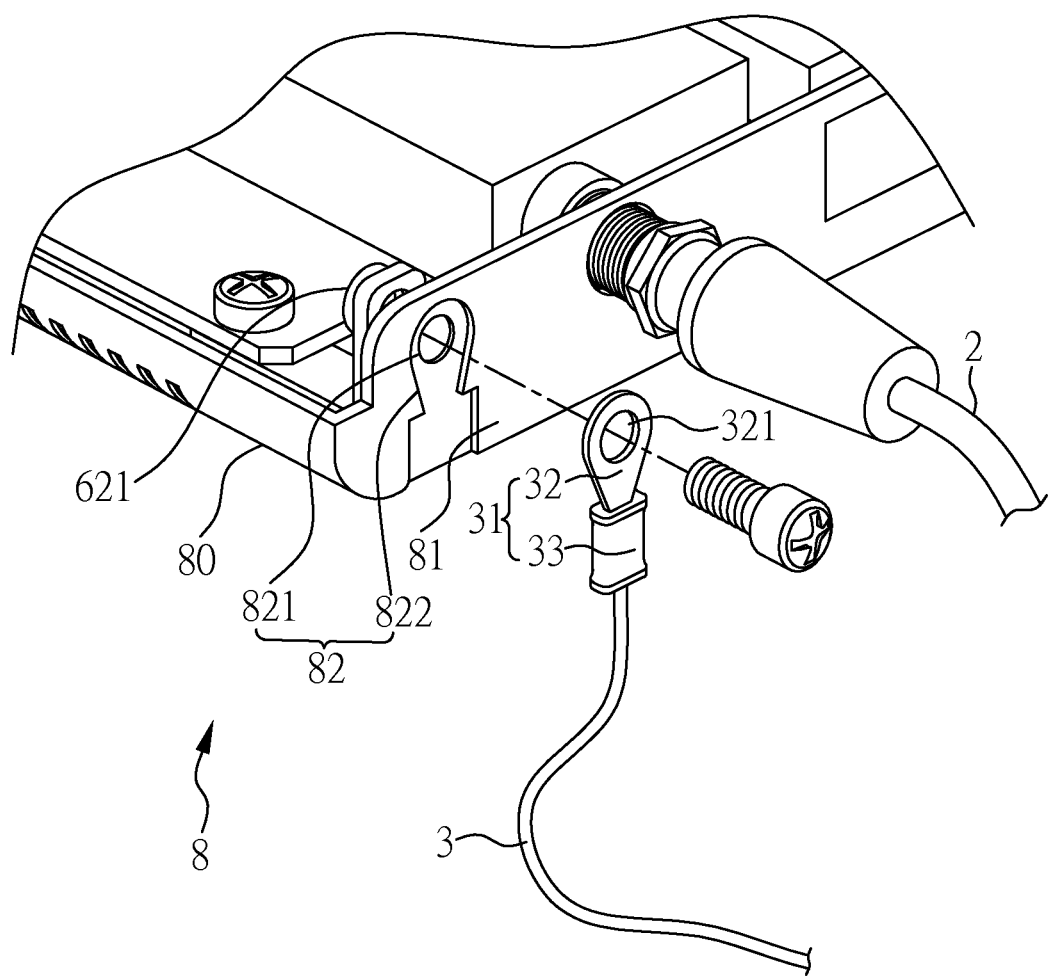
FIG. 4 is a schematic view of a conductive end portion joining into a through hole portion according to another preferred embodiment of the invention.

FIG. 4 is a schematic view of the conductive end portion joining into the through hole portion according to another preferred embodiment of the invention. As shown FIGS. 2 and 4, to avoid inconvenience in combining the set-top box device and a power supply line 3, the set-top box device 8 provided in this embodiment is different from the set-top box device 4 of FIG. 2 in that a through hole portion 82 is arranged on one lateral 81 of its insulation housing 80. The through hole portion 82 has a recess portion 822 and a through hole 821 in the recess portion 822. The through hole 821 is corresponding to the center hole 321 of the power supply line 3 and the second locking hole 621 of the metal portion 6, and the sectional shape of the recess portion 822 is corresponding to that of the outer portion 322 and sleeve 33, so as to effectively receive the conductive end portion 31 of the power supply line 3 for allowing a convenient assembling.

Figure 5:
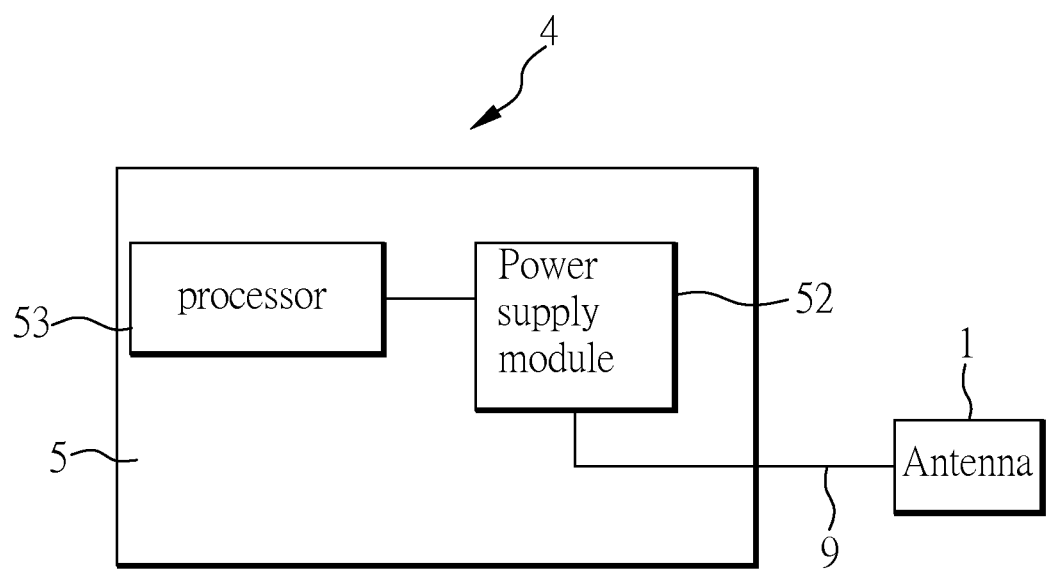
FIG. 5 schematically illustrates a system operation of a set-top box device according to another preferred embodiment of the invention.

FIG. 5 schematically illustrates a system operation of the set-top box device according to another preferred embodiment of the invention. As shown in FIGS. 1, 2, and 5, the printed circuit board 5 of the set-top box device 4 is electrically coupled to the antenna 1. On the printed circuit board 5, there are provided with a power supply module 52 and a processor 53. The processor 53 is the main chip for processing the signal from Antenna and is electrically coupled to the power supply module 52, and the power supply module 52 provides electrical power to the antenna 1 through a power supply circuit 9, so as to enable the antenna 1 to receive and transmit signals. The set-top box device 4 can receive signals transmitted by the antenna 1 and outputs corresponding signals to a display device, such as a liquid crystal display or a plasma display. In this embodiment, the power supply module 52 provides an input voltage of 3.3V and an output current of 0.02 A.

Figure 6:
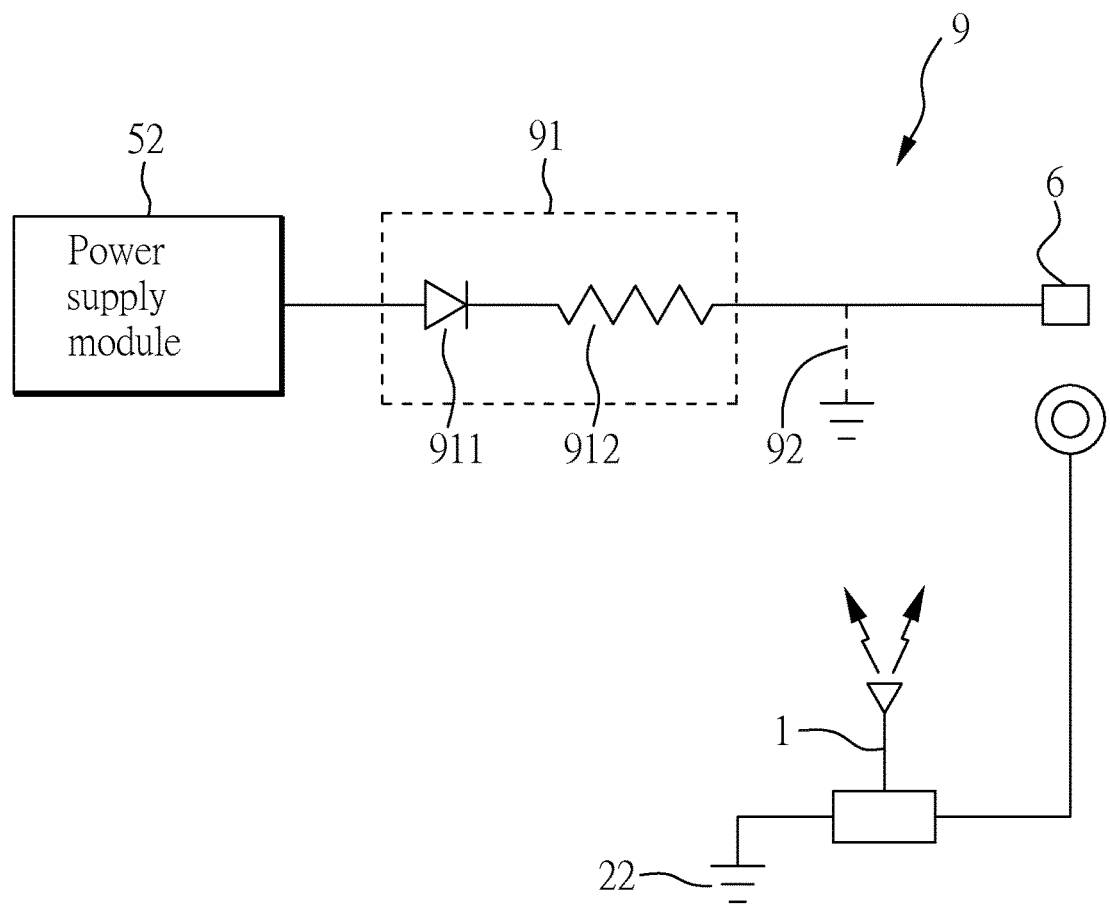
FIG. 6 is a schematic diagram of enabling a short-circuit protection circuit when a short-circuit condition occurs according to a preferred embodiment of the invention.

FIG. 6 is a schematic diagram of a short-circuit protection circuit enabled when a short-circuit condition occurs according to a preferred embodiment of the invention. As shown in FIGS. 5 and 6, the short-circuit protection circuit 91 is arranged between the power supply module 52 and the metal portion 6 in the power supply circuit 9, and the short-circuit protection circuit 91 includes a diode 911 and a resistor set 912 with a rated power, wherein the power supply module 52 feeds current that flows through the diode 911 and the resistor set 912 to the antenna 1, and the current flows to a ground portion 22 of the signal line 2 thereby forming a power supply loop 9. As shown in FIGS. 1 and 6, when there is a contact problem occurred among the metal portion 6, the conductive locking member 7, and the conductive end portion 31, the current of the power supply module 52 flows toward a short-circuit end 92 to thus form a short-circuit path. In this case, due to the design of the short-circuit protection circuit 91, the short-circuit damage to the device, which is caused by the contact problem, can be avoided, wherein the power generated when the current fed by the power supply module 52 passes through the resistor set 912 is smaller than the rated power. In this embodiment, the power supply module 51 provides an input voltage of 3.3V and an output current of 0.02 A, and the resistor set 912 has the rated power of 0.3 W.

In addition, the resistor set 912 may include a plurality of resistors connected in parallel, thereby increasing an upper limit of the available current provided by the power supply module 52.

Although the present invention has been explained in relation to its preferred embodiment, it is to be understood that many other possible modifications and variations can be made without departing from the spirit and scope of the invention as hereinafter claimed.

What is claimed is:

1. A set-top box device capable of providing electrical power to an antenna, wherein the antenna is electrically coupled to the set-top box device through a signal line and a power supply line, the set-top box device comprising:
   an insulation housing having at least one lateral arranged thereon a through hole portion and at least one connection port hole;
   a printed circuit board arranged in the insulation housing and including a power supply module and at least one connection port corresponding to the at least one connection port hole for electrically coupling to the signal line;
   a metal portion arranged on the printed circuit board and including a locking hole corresponding to the through hole portion; and
   a conductive locking member passing through the locking hole, the through hole portion, a conductive end portion of the power supply line, and the metal portion, so as to allow a current from the power supply module to be fed into the antenna via the conductive locking member,
   wherein the power supply module feeds the current into the antenna through a connection of the metal portion, the conductive locking member, and the conductive end portion, and the current flows to a ground portion of the signal line, thereby forming a power supply loop.

2. The set-top box device as claimed in claim 1, wherein the power supply circuit includes a short-circuit protection circuit which is arranged between the power supply module and the metal portion and has a diode and a resistor set with a rated power, such that the current fed by the power supply module sequentially passes through the diode and the resistor set.

3. The set-top box device as claimed in claim 2, wherein, when the metal portion, the conductive locking member, and the conductive end portion form a short-circuit path due to a contact problem, a power generated when the current passes through the resistor set is smaller than the rated power.

4. The set-top box device as claimed in claim 2, wherein the rated power of the resistor set is 0.3 W while the power supply module provides an input voltage of 3.3V and an output current of 0.02 A.

5. The set-top box device as claimed in claim 2, wherein the resistor set includes a plurality of resistors connected in parallel.

6. The set-top box device as claimed in claim 1, wherein the conductive end portion of the power supply line includes a metal ring slice having a center hole and an outer portion.

7. The set-top box device as claimed in claim 6, wherein the through hole portion includes a recess portion having a sectional shape corresponding to that of the outer portion, and a through hole in the recess portion that corresponds to the center hole and the locking hole.

8. The set-top box device as claimed in claim 1, wherein the conductive locking member is a screw.

9. The set-top box device as claimed in claim 1, wherein the antenna is an active antenna.

10. The set-top box device as claimed in claim 9, wherein the active antenna includes an antenna unit and a control base electrically coupled to the antenna unit, and the control base is electrically coupled to the set-top box device through the signal line and the power supply line.

* * * * *